(12) United States Patent
Shipman

(10) Patent No.: US 10,220,498 B2
(45) Date of Patent: Mar. 5, 2019

(54) METHOD FOR INSERTING A HOSE COUPLING INTO A HOSE

(71) Applicant: Duane G. Shipman, Edmond, OK (US)

(72) Inventor: Duane G. Shipman, Edmond, OK (US)

(*) Notice: Subject to any disclaimer, the term of this patent is extended or adjusted under 35 U.S.C. 154(b) by 367 days.

(21) Appl. No.: 15/090,380

(22) Filed: Apr. 4, 2016

(65) Prior Publication Data

US 2016/0214244 A1 Jul. 28, 2016

Related U.S. Application Data

(62) Division of application No. 13/960,516, filed on Aug. 6, 2013, now Pat. No. 9,302,379.

(51) Int. Cl.
| | | |
|---|---|---|
| *B23P 11/00* | (2006.01) | |
| *B25B 27/10* | (2006.01) | |
| *F16L 33/22* | (2006.01) | |
| *F16L 33/30* | (2006.01) | |
| *B25B 23/00* | (2006.01) | |

(52) U.S. Cl.
CPC ............ *B25B 27/10* (2013.01); *F16L 33/22* (2013.01); *F16L 33/227* (2013.01); *F16L 33/30* (2013.01); *B25B 23/0007* (2013.01); *Y10T 29/49826* (2015.01); *Y10T 29/5367* (2015.01); *Y10T 29/5397* (2015.01)

(58) Field of Classification Search
CPC ....... B23P 11/00; B23P 11/006; B23P 11/027; B23P 19/00; B23P 19/04; B23P 2700/00
See application file for complete search history.

(56) References Cited

U.S. PATENT DOCUMENTS

| | | | |
|---|---|---|---|
| 2,262,171 A | 11/1941 | Downes | |
| 2,298,379 A | 10/1942 | Hoffman | |
| 2,916,812 A | 12/1959 | Milo | |
| 3,787,950 A | 1/1974 | Bagby | |
| 4,059,883 A * | 11/1977 | Osborne | ............... B25B 27/023 279/42 |
| 4,154,465 A | 5/1979 | Van Meter | |
| 4,271,576 A | 6/1981 | Gunning | |
| 5,075,946 A | 12/1991 | Yeargin | |

(Continued)

FOREIGN PATENT DOCUMENTS

EP  0035519 EP  4/1984

OTHER PUBLICATIONS

International Search Report and Written Opinion (PCT/US2014/049414); dated Nov. 28, 2014.

*Primary Examiner* — Lee D Wilson
(74) *Attorney, Agent, or Firm* — Dunlap Codding, P.C.

(57) ABSTRACT

Apparatus and method for inserting a hose coupling into a hose, the coupling and the hose having inner surfaces defining an inner diameter. A shaft has a first and a second end. A gripping member is associated with the shaft and is movable between a relaxed condition wherein the gripping member has a diameter less than the inner diameters of the hose the coupling and an expanded condition wherein the diameter of the gripping member is increased so that the gripping member grippingly contacts the inner surface of the hose to secure the shaft in the hose in a way that the second end of the shaft extends from the hose. A pusher member is associated with the shaft, and is engageable with the coupling and is movable along the shaft towards the gripping member to insert the coupling into the hose.

4 Claims, 4 Drawing Sheets

(56) References Cited

U.S. PATENT DOCUMENTS

| | | | |
|---|---|---|---|
| 5,090,102 A * | 2/1992 | Lovell | B25B 27/06 |
| | | | 29/255 |
| 5,875,534 A * | 3/1999 | Jackson | B25B 27/02 |
| | | | 29/255 |
| 5,979,032 A | 11/1999 | Roy | |
| 6,254,144 B1 | 7/2001 | Hagan | |
| 6,345,426 B1 * | 2/2002 | Collier | B25B 5/147 |
| | | | 29/263 |
| 6,360,415 B1 * | 3/2002 | Wada | B21D 41/02 |
| | | | 29/281.1 |
| 6,609,283 B1 | 8/2003 | Somerville | |
| 2005/0199308 A1 | 9/2005 | Swails et al. | |
| 2007/0024051 A1 | 2/2007 | Witz et al. | |
| 2008/0128039 A1 | 6/2008 | Cox | |
| 2009/0101750 A1 | 4/2009 | Marecki et al. | |

* cited by examiner

METHOD FOR INSERTING A HOSE COUPLING INTO A HOSE

CROSS REFERENCE TO RELATED APPLICATION

This application is a divisional of U.S. patent application Ser. No. 13/960,516, filed Aug. 6, 2013, the entire contents of which are hereby incorporated herein by reference.

BACKGROUND

Various hose fittings and hose couplings are press-fitted, pushed, pressed, swagged, or otherwise connected with a hose in a variety of industrial, residential, and commercial settings and applications. Such fittings and couplings are generally made of metals or resilient plastics and are implemented to allow the hose to be fluidly coupled with another hose, a conduit, or a vessel.

In some cases, a hose coupling with an external diameter slightly larger than the internal diameter of the hose may be press-fitted or pushed into an end of the hose. The hose coupling may include a variety of surface features on its external surface configured to securely retain the hose coupling in the hose. Such features may include directional teeth, grooves, or striations.

One way to insert a hose coupling into a hose is to manually hammer the hose coupling into the hose. To enable easier insertion of hose couplings into hoses, a variety of tools and devices have been developed. Some existing devices are bulky and cumbersome and are difficult to move and operate in the field. Other existing devices rely on electrical or hydraulic power sources to operate and are expensive to manufacture and failure-prone.

Further, existing coupling inserting devices generally grasp the external surface of the hose with a variety of clamps, vices, pliers, or grasping members which are generally configured to grip, grasp, or compress the external surface of the hose. One problem that ma be encountered with the use of such devices in that damage may occur to the external surface of the hose, which in turn may cause leaks and ruptures of the hose during its use. Also, applying pressure to the external surface of the hose via existing devices may partially or completely collapse the hose and may restrict the internal diameter of the hose so that insertion of a hose coupling into the hose is impeded.

SUMMARY OF THE INVENTIVE CONCEPTS

The inventive concepts disclosed herein are generally directed to apparatuses for inserting hose couplings into hoses, and more particularly, but not by way of limitation to an apparatus for inserting a hose coupling in an open end of a hose.

An apparatus for inserting a hose coupling into a hose according to some embodiments of the inventive concepts disclosed herein may include a shaft, a gripping member, and a pusher member. The hose and the hose coupling may have inner surfaces and may define inner diameters. The shaft has a first end and a second end. The gripping member is associated with the shaft, and is movable between a relaxed condition and an expanded condition. In the relaxed condition, the gripping member has a diameter less than the inner diameter of the hose and less than the inner diameter of the hose coupling. In the expanded condition the diameter of the gripping member is increased so that the gripping member grippingly contacts the inner surface of the hose to secure the shaft in the hose in a way that the second end of the shaft extends from an end of the hose. The pusher member is associated with the shaft, and is engageable with the free end of the hose coupling when the hose coupling is partially disposed in the end of the hose and the gripping member is positioned in the hose and in the expanded condition so as to be in gripping contact with the inner surface of the hose. The pusher member is movable along the shaft towards the gripping member to cause the hose coupling to be inserted into the hose.

In some embodiments, an apparatus for inserting a hose coupling into a hose according to the inventive concepts disclosed herein may include a shaft and a gripping member associated with shaft. The gripping member is movable between a relaxed condition and an expanded condition wherein the gripping member is expanded in a radial direction.

In some exemplary embodiments, the gripping member may be moved between the relaxed condition and the expanded condition by a compression assembly. The compression assembly includes a first compression plate and a second compression plate. The first compression plate is positioned on one side of the gripping member and the second compression plate is positioned on an opposing side of the gripping member. The second compression plate is movable towards the first compression plate to compress the gripping member between the first compression plate and the second compression plate so as to cause the gripping member to move to the expanded condition. The second compression plate is movable away from the first compression plate to allow the gripping member to move to the relaxed condition.

A pusher member can be threadingly disposed about a portion of the compression assembly. The pusher member can be engaged with the free end of the hose coupling when the hose coupling is partially disposed in an end of the hose and the gripping member is positioned in the hose and in the expanded condition so as to be in gripping contact with the inner surface of the hose. The pusher member may be movable along the compression assembly toward the gripping member so as to cause the hose coupling to move into the hose along the inner surface of the hose.

In some embodiments, an apparatus for inserting a hose coupling into a hose according to the inventive concepts disclosed herein can be provided as a kit including the shaft, the gripping member, the compression assembly and/or the pusher member.

In operation, exemplary embodiments of an apparatus for inserting a hose coupling into a hose according to the inventive concepts disclosed herein may function as follows. The gripping member is inserted into an end of a hose. The gripping member is moved to the expanded condition to cause the gripping member to grippingly or frictionally engage an inner surface of the hose so as to secure the shaft into the hose such that an end of the shaft extends from the end of the hose. The hose coupling is associated with the end of the hose and the pusher member is associated with the end of the shaft extending from the end of the hose. The pusher member is advanced down the shaft to insert the hose coupling into the hose. Once the hose coupling is inserted into the hose, the gripping member is moved to the relaxed condition and the shaft and the gripping member are removed from the hose by being slid out of the hose through the hose coupling.

BRIEF DESCRIPTION OF THE DRAWINGS

Like reference numerals in the figures represent and refer to the same or similar element or function. Implementations of the inventive concepts disclosed herein may be better understood by referring to the following detailed description thereof. Such description makes reference to the annexed pictorial illustrations, schematics, graphs, drawings, and appendices. In the drawings.

DETAILED DESCRIPTION OF EXEMPLARY EMBODIMENTS

Figure 1:
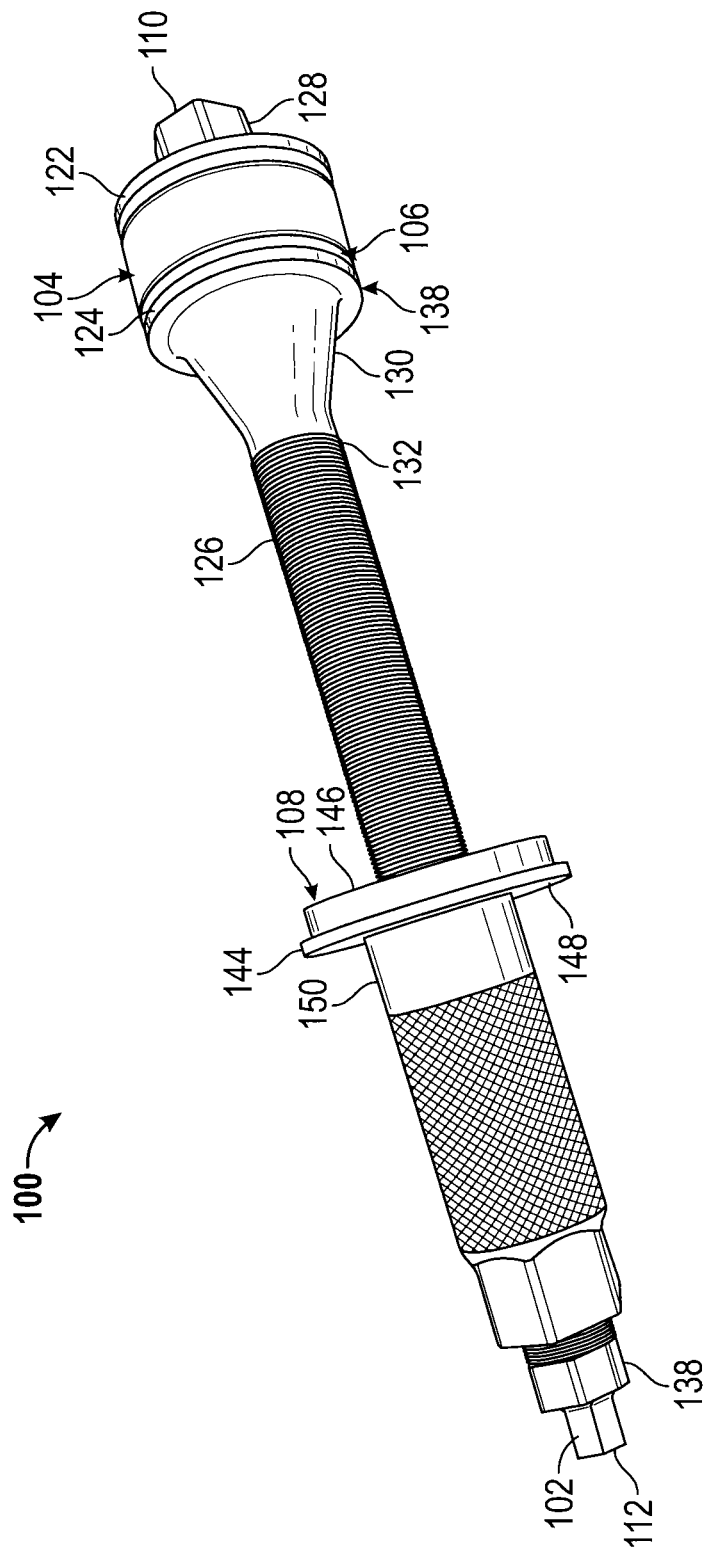
FIG. 1 is a perspective view of an embodiment of an apparatus for inserting a hose coupling into a hose according to the inventive concepts disclosed herein.
Figure 2:
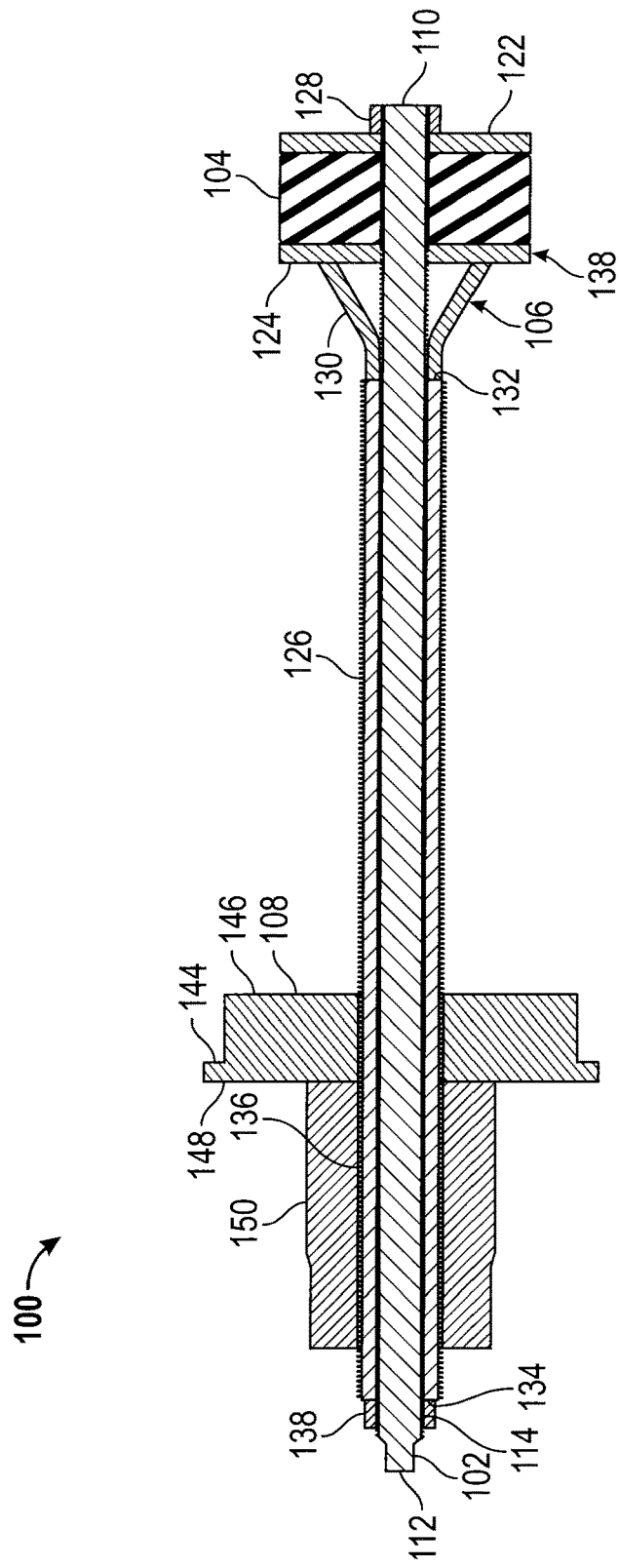
FIG. 2 is a cross-sectional view of the apparatus of FIG. 1 shown with a gripping member in a relaxed condition.

Before explaining at least one embodiment of the inventive concepts disclosed herein in detail, it is to be understood that the inventive concepts disclosed herein are not limited in their application to the details of construction and the arrangement of the components or steps or methodologies set forth in the following description or illustrated in the drawings. The inventive concepts disclosed herein are capable of other embodiments or of being practiced or carried out in various ways. Also, it is to be understood that the phraseology and terminology employed herein is for the purpose of description only and should not be regarded as limiting the inventive concepts disclosed and claimed herein in any way.

In the following detailed description of embodiments of the inventive concepts, numerous specific details are set forth in order to provide a more thorough understanding. However, it will be apparent to one of ordinary skill in the art that the inventive concepts within the disclosure may be practiced without these specific details. In other instances, well-known features may not be described in detail to avoid unnecessarily complicating the instant disclosure.

As used herein the notation "a-n" appended to a reference numeral is intended as merely convenient shorthand to reference one, or more than one, and up to infinity, of the element or feature identified by the respective reference numeral (e.g., 100a-n). Similarly, a letter following a reference numeral is intended to reference an embodiment of the feature or element that may be similar, but not necessarily identical, to a previously described element or feature bearing the same reference numeral (e.g., 100, 100a, 100b, etc.). Such shorthand notations are used for purposes of clarity and convenience only, and should not be construed to limit the instant inventive concepts in any way, unless expressly stated to the contrary.

Further, unless expressly stated to the contrary, "or" refers to an inclusive "or" and not to an exclusive "or." For example, a condition A or B is satisfied by anyone of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the inventive concepts. This description should be read to include one or at least one and the singular also includes the plural unless it is obvious that it is meant otherwise.

Finally, as used herein, any reference to "one embodiment" or "an embodiment" means that a particular element, feature, structure, or characteristic described in connection with the embodiment is included in at least one embodiment. The appearances of the phrase "in one embodiment" in various places in the specification are not all necessarily referring to the same embodiment.

Referring now to FIGS. 1-4, shown therein is an exemplary embodiment of an apparatus 100 for inserting a hose coupling 118 (FIGS. 3 and 4) into a hose 116 (FIGS. 3 and 4) according to the inventive concepts disclosed herein. Broadly, the apparatus 100 includes a shaft 102, a gripping member 104, a compression assembly 106, and a pusher member 108.

The shaft 102 has a first end 110 and a second end 112, and may include a threaded portion 114 (FIG. 2) in some exemplary embodiments. The shaft 102 may be constructed of any desired material, such as metals, alloys, non-metals, plastics, resins, or combinations thereof. The shaft 102 is shown as being substantially cylindrical in shape; however, the shaft 102 may have any desired shape, diameter, cross-section, and length, as will be appreciated by persons of ordinary skill in the art having the benefit of the instant disclosure. The second end 112 of the shaft 102 may be configured to facilitate gripping of the shaft 102 with tools, such as a wrench or a pair of pliers. For example, the second end 112 of the shaft 102 may be square shaped or hex shaped.

Figure 3:
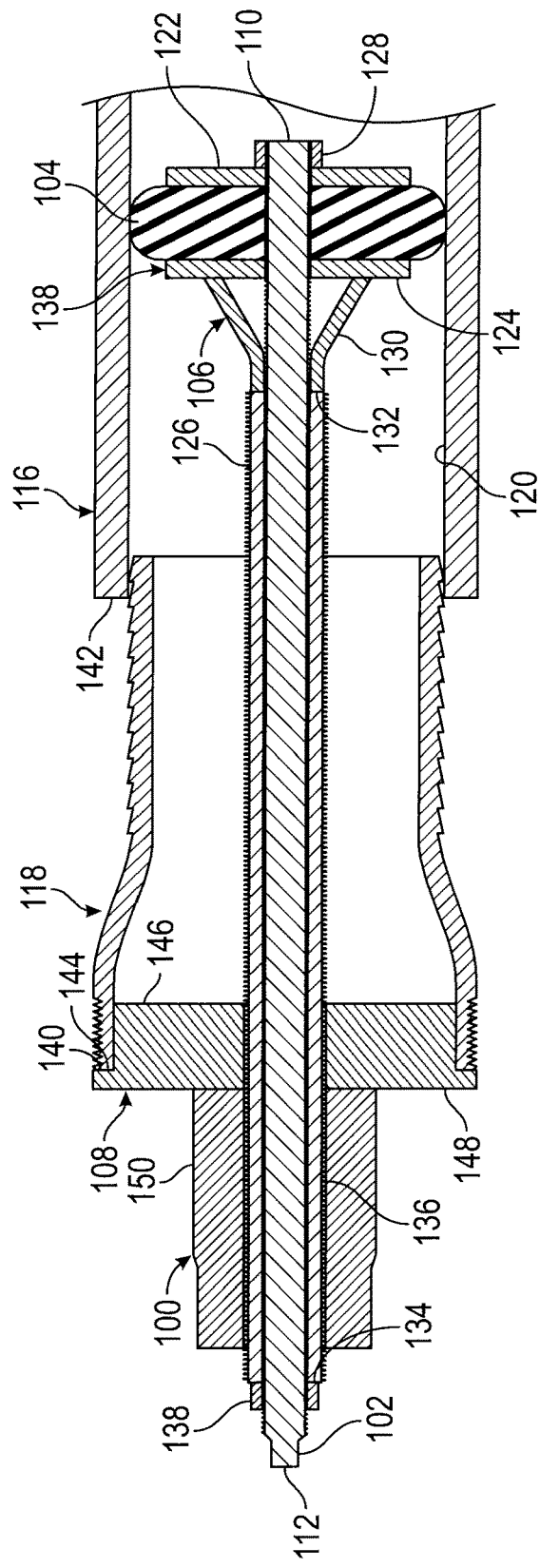
FIG. 3 is a cross-sectional view of the apparatus of FIG. 1 shown positioned in a hose coupling and a hose with the gripping member in an expanded condition.

The gripping member 104 is associated with the shaft 102 (e.g., slidably), and is movable between a relaxed condition (FIGS. 1, 2, and 4) wherein the gripping member 104 has a diameter less than the inner diameter of the hose 116 and less than the inner diameter of the hose coupling 118, and an expanded condition (FIG. 3) wherein the diameter of the gripping member 104 is increased so that the gripping member 104 grippingly contacts an inner surface 120 of the hose 116 to secure the shaft 102 in the hose 116 in a way that the second end 112 of the shaft 102 extends from an end of the hose 116, as shown in FIG. 3. The gripping member 104 may expand in a generally radial or lateral direction when moved from the relaxed condition to the expanded condition. The hose 116 may be implemented as any desired hose, pipe, and/or conduit and may be flexible or substantially rigid. The hose coupling 118 may be any desired coupling, fitting, or flange, as will be appreciated by persons of ordinary skill in the art having the benefit of the instant disclosure.

The gripping member 104 may be constructed of any desired resilient or compressible material, such as rubber, resins, polymers, fibrous materials, plastics, and combinations thereof, in order to move the gripping member 104 between the relaxed condition and the expanded condition. The gripping member 104 is shown as being substantially cylindrical, but the gripping member 104 may have any desired shape, size and cross-section, and may be configured to correspond to the inner surface 120 and shape of the hose 116. It is to be understood that while a single gripping member 104 is shown in FIGS. 1-4, two or more into gripping members 104 may be implemented with the inventive concepts disclosed herein.

The gripping member 104 may be moved between the relaxed condition and the expanded condition in any desired manner. For example, while the gripping member 104 is shown in FIGS. 1-4 as a mechanically compressible gripping member 104, in some exemplary embodiments, a pneumatically or hydraulically expandable or inflatable gripping member 104 may be implemented. For example, the gripping member 104 may be implemented as an inflatable member (e.g., a bladder or a bag) and may be fluidly coupled with any suitable source of pressurized gas, liquid, or fluid which may be used to selectively move the gripping member 104 between the relaxed condition and the expanded condition.

In one exemplary embodiment, the gripping member 104 may be moved between the relaxed condition and the expanded condition by the compression assembly 106. The compression assembly 106 may include a first compression plate 122, a second compression plate 124, and a sleeve 126. The first compression plate 122 may be disposed about the shaft 102 in any desired manner and is positioned adjacent to the first end 110. A stop member 128 may be associated with the shaft 102 and configured to prevent the first compression plate 122 from moving past the first end 110 of the shaft 102. In some exemplary embodiments, the stop member 128 may be omitted and/or the first compression plate 122 and the shaft 102 may be formed as a unitary component.

The first compression plate 122 may have any desired shape, size, and cross-section configured to at least partially correspond to the shape and size of the gripping member 104. The first compression plate 122 may have a substantially flat surface configured to contact the gripping member 104 so as to cause the gripping member 104 to be compressed against the first compression plate 122. The first compression plate 122 has a diameter less than an internal diameter of the hose 116 and less than an internal diameter of the hose coupling 118 to allow the compression assembly 106 to be inserted into the hose 116 and removed from the hose 116 and the hose coupling 118, as will be described below. In some exemplary embodiments, the first compression plate 122 may have a diameter less than, or substantially equal to, the diameter of the gripping member 104 when the gripping member 104 is in the relaxed condition. The first compression plate 122 can be constructed of any suitable materials, such as metals, alloys, non-metals, plastics, and combinations thereof.

The second compression plate 124 is disposed about the shaft 102 such that the second compression plate 124 is movable along the shaft 102 in a to and fro relationship relative to first compression plate 122. The second compression plate 124 may be implemented similarly to the first compression plate 122 such that the second compression plate 124 has a diameter less than an internal diameter of the hose 116 and the hose coupling 118 to allow the compression assembly 106 to be inserted into the hose 116 and removed from the coupling 118, as will be described below. In addition, the second compression plate 124 may include an adapter portion 130 configured to facilitate contact between the second compression plate 124 and the sleeve 126.

In the embodiment shown in FIGS. 1-4, the first compression plate 122 is positioned on one side of the gripping member 104 and the second compression plate 124 is positioned on an opposing side of the gripping member 104 in such a way that the gripping member 104 is compressed between the first compression plate 122 and the second compression plate 124 to cause the gripping member 104 to move to the expanded condition. To cause the gripping member 104 to move to the relaxed condition, the second compression plate 124 is movable away from the first compression plate 122. The second compression plate 124 may be moveable along the shaft 102 in any desired manner such as via movement of the sleeve 126, as will be described below.

The sleeve 126 has a first end 132 and a second end 134 and is disposed about a portion of the shaft 102 with the first end 132 engageable with the second compression plate 124. The sleeve 126 has a threaded portion 136 positioned between the first end 132 and the second end 134 thereof. The sleeve 126 may be constructed of any desired materials, and may have any desired size, shape, and cross-section configured to match the shape, size, and cross-section of the shaft 102 so that the sleeve 126 is configured to be disposed about a portion of the shaft 102. While a single sleeve 126 is shown in FIGS. 1-4, it is to be understood that two or more than two sleeves 126 may be implemented with the inventive concepts disclosed herein.

In some embodiments, a compression member 138 (e.g., a threaded nut) can be threadingly connected to the threaded portion 114 of the shaft 102 between the second end 112 of the shaft 102 and the second end 134 of the sleeve 126 such that movement of the compression member 138 along the threaded portion 114 of the shaft 102 causes the sleeve 126 and the second compression plate 124 to move axially relative to the shaft 102. In some exemplary embodiments, the compression member 138 and the sleeve 126 may be formed as a unitary component, while in some embodiments the compression member 138 may be omitted and/or the sleeve 126 may be threadingly and movably coupled with the threaded portion 114 of the shaft 102, as will be appreciated by persons of ordinary skill in the art having the benefit of the instant disclosure.

The pusher member 108 is disposed about the sleeve 126 and is configured to be advanced from the second end 134 toward the first end 132 of the sleeve 126. In some exemplary embodiments, the pusher member 108 may be sized and configured so as to be engageable with a free end 140 of the hose coupling 118 when the hose coupling 118 is partially disposed in an end 142 of the hose 116 and the gripping member 104 is positioned in the hose 116 and in the expanded condition so as to be in gripping contact with inner surface 120 of the hose 116. For example, in some exemplary embodiments, the pusher member 108 may include a pusher plate 148 disposed about the sleeve 126 and a compression member 150 threadingly connected to the threaded portion 136 of the sleeve 126. The compression member 150 may be engageable with the pusher plate 148 in a way so that rotational movement of the compression member 150 about the sleeve 126 causes the pusher plate 148 to move in an axial direction along the sleeve 126. To facilitate rotation of the compression member 150 relative to the pusher plate 148, the pusher plate 148 may be provided with a bearing, such as a thrust bearing (not shown), positioned to be contacted by the compression member 150 when the compression member 150 is rotated on the the sleeve 126. The pusher plate 148 and the compression member 150 may be constructed of any suitable material, such as metals, alloys, resilient plastics, resins, non-metals, and combinations thereof. It is to be understood that in some exemplary embodiments, the pusher plate 148 and the compression member 150 may be formed as a unitary component.

The pusher plate 148 may include a flange 144 and a hub 146 with the flange 144 configured to rest against the free end 140 of the hose coupling 118 and the hub 146 configured to be at least partially inserted into the free and 140 of the hose coupling 118. In this manner, the flange 144 and the hub 146 may cooperate with one another to engage the hose coupling 118. The flange 144 may be provided with a plurality of magnets (not shown) to provide better contact between the pusher plate 148 and the free end 140 of the house coupling 118. In one embodiment, the magnets may be disposed in the face of the flange 144 opposite the face that contacts the free end 140 of the hose coupling 118.

As will be appreciated by persons of ordinary skill in the art, in some exemplary embodiments, the various components of the apparatus 100 may be provided as a kit, which may include a variety of sizes and diameters of gripping members configured to insert various sizes hose couplings 118 into various size hoses 116. A user may assemble the apparatus 100 from the kit by selecting appropriately sized shaft 102, gripping member 104, compression assembly 106, and pusher member 108, depending on the inner diameters of the hose coupling 118 and of the hose 116 into which the hose coupling 118 is to be inserted by the apparatus 100.

Figure 4:
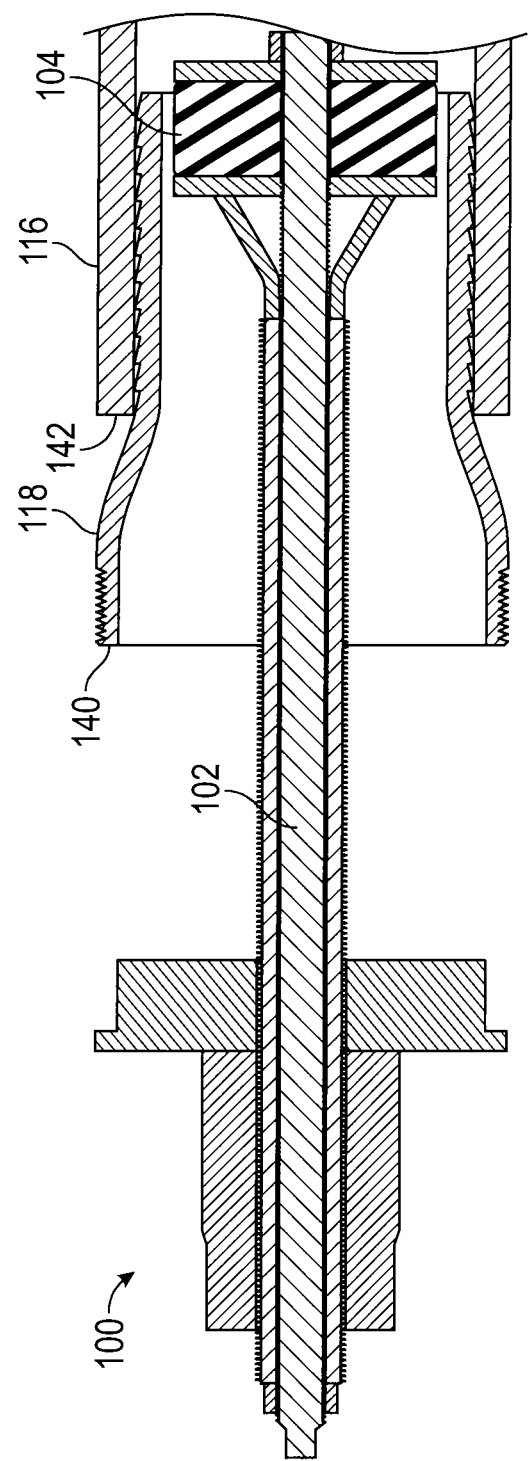
FIG. 4 is a cross-sectional view of the apparatus of FIG. 1 shown with the gripping member in the relaxed condition and being removed from the hose.

Referring now to FIGS. 3 and 4, an exemplary method of inserting a hose coupling (e.g., the hose coupling 118) into a hose (e.g., the hose 116) using the apparatus 100 according to the inventive concepts disclosed herein may proceed as follows.

A user inserts the gripping member 104, which is associated with the shaft 102, into the end 142 of the hose 116 and causes the gripping member 104 to move to the expanded condition by rotating the compression member 138 to cause the sleeve 126 to move the second compression plate 124 toward the first compression plate 122. Movement of the second compression plate 124 toward the first compression plate 122 causes the gripping member 104 to be compressed between the first compression plate 122 and the second compression plate 124 in a way that causes the gripping member 104 to grippingly contact the inner surface 120 of the hose 116. The user then associates the hose coupling 118 with the second end 112 of the shaft 102 extending from the hose 116. For example, the user may insert the hose coupling 118 over the shaft 102 such that the free end 140 of the hose coupling 118 is positioned to face the second end 112 of the shaft 102 and such that the hose coupling 118 is at least partially positioned in the end 142 of the hose 116. The user then positions the pusher member 108 over the sleeve 126 and advances the pusher member 108 along the sleeve 126 to cause the hose coupling 118 to be forced or otherwise inserted into the hose 116. The pusher member 108 may be advanced along the sleeve 126 by rotation of the compression member 150 relative to the sleeve 126.

With the hose coupling 118 positioned in the hose 116, the user removes the gripping member 104 from the hose 116 by moving the gripping member 104 to the relaxed condition and withdrawing the shaft 102 and the gripping member 104 from the hose 116 so that the gripping member 104 slides out of the end 142 of the hose 116 and through the free end 140 of the hose coupling 118.

It is to be understood that the steps disclosed herein may be performed simultaneously or in any desired order, and may be carried out by a human, or by a machine, and combinations thereof, for example. For example, one or more of the steps disclosed herein may be omitted, one or more steps may be further divided in one or more sub-steps, and two or more steps or sub-steps may be combined in a single step, for example. Further, in some exemplary embodiments, one or more steps may be repeated one or more times, whether such repetition is carried out sequentially or interspersed by other steps or sub-steps. Additionally, one or more other steps or sub-steps may be carried out before, after, or between the steps disclosed herein, for example.

From the above description, it is clear that the inventive concepts disclosed herein are adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the scope of the inventive concepts disclosed herein and defined by the appended claims.

What is claimed is:

1. A method of inserting a hose coupling into a hose, the method comprising:
   inserting a gripping member associated with a shaft into the hose and causing the gripping member to move to an expanded condition such that the gripping member grippingly contacts an inner surface of the hose and an end of the shaft extends from an end of the hose;
   associating the hose coupling with the end of the shaft extending from the end of the hose;
   advancing the hose coupling along the shaft such that the hose coupling is inserted into the end of the hose; and
   removing the gripping member from the hose.

2. The method of claim 1, wherein removing the gripping member from the hose comprises:
   causing the gripping member to move to a relaxed condition where the gripping member has diameter less than an internal diameter of the hose and less than an internal diameter of the hose coupling; and
   withdrawing the gripping member from the hose through the hose coupling.

3. The method of claim 2, wherein the gripping member is formed of a compressible resilient material and radially extendable from the shaft, and wherein the step of causing the gripping member to move to the expanded condition comprises compressing the gripping member.

4. The method of claim 1, wherein the gripping member is formed of a compressible resilient material and radially extendable from the shaft, and wherein the step of causing the gripping member to move to the expanded condition comprises compressing the gripping member.

* * * * *